United States Patent
Wallace et al.

(10) Patent No.: US 11,249,538 B2
(45) Date of Patent: Feb. 15, 2022

(54) METHOD AND APPARATUS FOR DYNAMIC AUXILIARY PORT POWER MANAGEMENT

(71) Applicant: Gulfstream Aerospace Corporation, Savannah, GA (US)

(72) Inventors: Matthew Wallace, Savannah, GA (US); Dean Knight, Savannah, GA (US); Kristin Medin, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 45 days.

(21) Appl. No.: 16/736,061

(22) Filed: Jan. 7, 2020

(65) Prior Publication Data
US 2021/0208665 A1 Jul. 8, 2021

(51) Int. Cl.
G06F 1/26 (2006.01)
G06F 1/3234 (2019.01)
G06F 1/3296 (2019.01)

(52) U.S. Cl.
CPC ............ *G06F 1/3253* (2013.01); *G06F 1/266* (2013.01); *G06F 1/3296* (2013.01)

(58) Field of Classification Search
CPC ...... G06F 1/266; G06F 1/3253; G06F 1/3296; H02J 7/00036; H02J 7/0052
USPC ......................................................... 713/320
See application file for complete search history.

(56) References Cited

U.S. PATENT DOCUMENTS

| | | | | |
|---|---|---|---|---|
| 7,793,126 B2* | 9/2010 | McGrane | ................. | G06F 1/26 713/320 |
| 8,904,217 B2* | 12/2014 | Harris | ................. | G06F 1/3206 713/323 |
| 9,914,548 B1* | 3/2018 | Vadillo | ............... | H02J 7/00036 |
| 2004/0230846 A1* | 11/2004 | Mancey | ............ | H04L 12/40045 713/300 |
| 2004/0230848 A1* | 11/2004 | Mayo | .................... | G06F 1/3203 713/320 |
| 2013/0241284 A1* | 9/2013 | Santini | ............. | H02J 13/00002 307/31 |
| 2014/0325245 A1* | 10/2014 | Santini | .................... | G06F 1/266 713/300 |
| 2016/0329724 A1* | 11/2016 | Ibrahim | .................. | H02J 7/007 |
| 2018/0150121 A1* | 5/2018 | Basterash | ............. | G06F 1/3215 |
| 2019/0171267 A1* | 6/2019 | Piwonka | .................. | G06F 1/28 |

* cited by examiner

*Primary Examiner* — Chun Cao
(74) *Attorney, Agent, or Firm* — LKGlobal | Lorenz & Kopf, LLP

(57) ABSTRACT

The present application teaches methods and apparatuses related to providing dynamic auxiliary port power management including providing a first current to a first auxiliary port and a second current to a second auxiliary port, determining a system power level in response to the first current and the second current, comparing the system power level to a system power level threshold, and providing a third current to the second auxiliary port in response to the system power level exceeding the system power level threshold, the third current having a lower amperage than the second current.

20 Claims, 4 Drawing Sheets

METHOD AND APPARATUS FOR DYNAMIC AUXILIARY PORT POWER MANAGEMENT

BACKGROUND

The present disclosure relates generally to programming of electronic auxiliary port capability distinction systems. More specifically, aspects of this disclosure relate to systems, methods and devices for dynamically providing auxiliary port power management to a plurality of auxiliary ports in response to total system power rates.

Electronic auxiliary ports, such as universal serial bus (USB) ports or the like, are becoming ubiquitous as the use of rechargeable portable electronic devices increases. During this increase, the USB port has become a de facto standard for manufacturers and users looking for convenient and readily available charging locations. In addition to enabling communications between devices, the USB port also supplies power to the connected device enabling charging during communications or simply during connection to a USB power supply. Auxiliary ports have become ubiquitous in restaurants, coffee shops, automobiles, aircraft, trains, and virtually any device that plugs into a wall, such as lamps and alarm clocks.

However, in a system with multiple auxiliary charging ports, such as on a passenger aircraft, the total power demand from multiple connected devices may exceed the maximum power output of the system power allotment. Typically, when multiple charging port systems are provided, it is assumed the system will have less than 100% maximum utilization. Therefore, a maximum number of devices each consuming a maximum power for each respective port may exceed a maximum power output for a system power supply. For example, a USB-C auxiliary port may supply up to 20 volts and 5 amps for 100 watts of power. If multiple devices are connected to multiple to USB-C charging ports on an aircraft system and are allowed to draw power at a maximum charge rate, the combined power consumption will quickly exceed the allotted power budget for the system. Reducing the maximum power to each port may provide customers a slower charging experience or may provide insufficient wattage to all devices and thereby degrading or eliminating operation for all users. It would be desirable to provide an improved dynamic auxiliary port power management system in order to overcome the aforementioned problems and to provide sufficient power delivery in response to desired performance and optimal utilization of power distribution.

The above information disclosed in this background section is only for enhancement of understanding of the background of the invention and therefore it may contain information that does not form the prior art that is already known in this country to a person of ordinary skill in the art.

SUMMARY

Disclosed herein are electronic device communications charging systems and method of related control logic for provisioning auxiliary ports, methods for making and methods for operating such systems, and vehicles equipped with onboard control systems. By way of example, and not limitation, there is presented an aircraft with onboard auxiliary charging and communications ports and control systems.

In accordance with an aspect of the present disclosure, an apparatus including a first port configured to couple a first connected device to a power supply, a second port configured to couple a second connected device to the power supply, the power supply configured to couple a first current to the first port and a second current to the second port, the power supply being further configured to couple a third current to the second port in response to a control signal from a processor, and the processor configured to compare the sum of the first current and the second current to a threshold value and to generate the control signal in response to the sum of the first current and the second current exceeding the threshold value.

In accordance with another aspect of the present disclosure, a method performed by a processor including providing a first current to a first auxiliary port and a second current to a second auxiliary port, determining a system power level in response to the first current and the second current, comparing the system power level to a system power level threshold, and providing a third current to the second auxiliary port in response to the system power level exceeding the system power level threshold, the third current having a lower amperage than the second current.

In accordance with another aspect of the present disclosure, an entertainment system in an aircraft cabin including a first auxiliary port operative at a first power level, a second auxiliary port operative at the first power level, a power supply for generating a first current to supply the first power level to the first auxiliary port and a second current to provide the first power level to the second auxiliary port, and a processor for determining a total power in response to the first current and the second current, the processor being further operative to generate a control signal to couple to the power supply to reduce an amperage of the second current in response to the total power exceeding a threshold power level.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
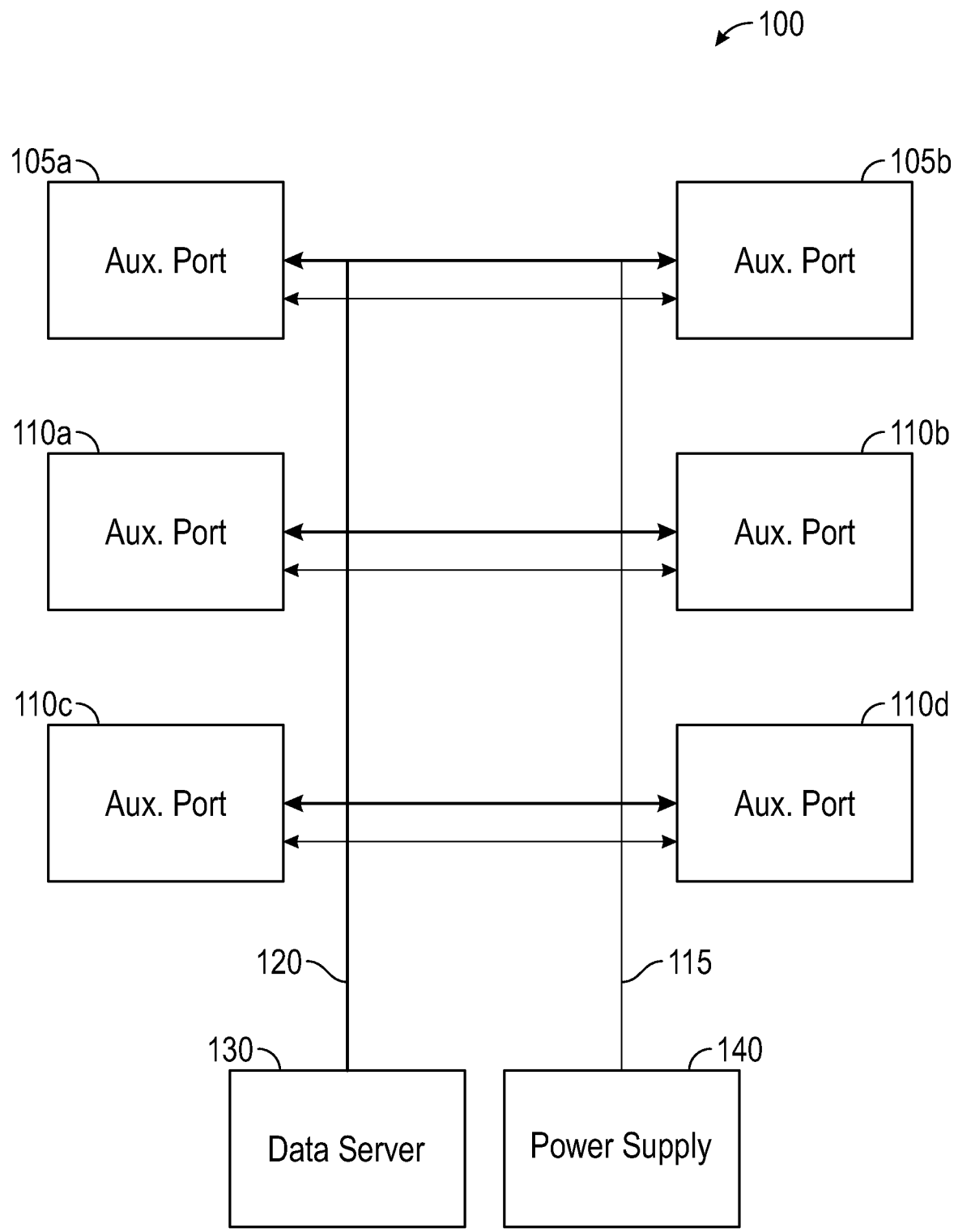
FIG. 1 shows a block diagram illustrating a system for providing dynamic auxiliary port power management according to an exemplary embodiment.

FIG. 1 shows a block diagram illustrating an exemplary implementation of a system 100 for providing dynamic auxiliary port power management. Although the system 100 according to the exemplary embodiment is described in terms of an aircraft cabin environment, it is not limited thereto and is equally applicable to other suitable environments. The exemplary system 100 depicts a data and power network for supplying electrical power to a first plurality of auxiliary ports 105a, 105b, a second plurality of auxiliary ports 110a, 110b 110c, 110d, a power supply 140 for conditioning and transmitting electrical power to the auxiliary port via a power supply bus 115 and a data server 130 for transmitting and receiving data via a data bus 120.

In this exemplary embodiment, the power supply 140 is operative to supply electrical power via the power bus 115 to the first plurality of auxiliary ports 105a, 105b, and the second plurality of auxiliary ports 110a, 110b 110c, 110d. As connected devices, such as laptop computers or mobile phones, are connected to each of the auxiliary ports, the current provided by the power supply increases. For example, a USB-C device may draw as much as 5 amps at 20 volts. If two USB-C devices, such as laptops, are plugged into each of the first plurality of auxiliary ports 105a, 105b, the total current required to be provided by the power supply 140 may be as much as 10 amps. In this example, the total power supplied would be 200 watts. A USB 2.0 device may consume as much as 5 watts at 1 amp and 5 volts. As additional devices are coupled to other auxiliary ports, the current required is increased with each device. At some point, the power supply will reach its maximum power output.

In an exemplary aircraft cabin environment, the data server 130 may be part of a cabin management system (CMS) and may monitor the total power available to the auxiliary ports and how much each individual port is consuming. Auxiliary ports may be allowed to charge at their max rating as long as the combined system power threshold is not exceeded. When a new device is plugged in the system and if the combined system power threshold is exceeded, the data server 130 may prioritize power deliver to auxiliary ports based on a predetermined ranking. Lowest ranked ports will be throttled to a lower power setting to allow higher priority ports to maintain increased charging rates. For example, in this embodiment, if an additional device is plugged into an auxiliary port and the combined system power threshold is then exceeded, the system may be operative to reduce the power supplied to the second plurality of auxiliary ports 110a, 110b 110c, 110d and maintain maximum power rates to the first plurality of auxiliary ports 105a, 105b. Auxiliary ports can be ranked based on associated seat, device type, and/or user. The exemplary system enables the CMS to maintain the highest level experience for some auxiliary ports while maintaining functionality for the other auxiliary ports.

In another example, the power supply 140 may be operative to supply power to the first plurality of auxiliary ports 105a, 105b and the second plurality of auxiliary ports 110a, 110b 110c, 110d. The power supply 140 may be operative to monitor the combined system power and to provide this combined system power to the data server 130. The data server 130 may compare the combined system power to a combined system power threshold. If the combined system power exceeds the combined system power threshold, the data server may generate a control signal to couple via the data bus 120 to the second plurality of auxiliary ports 110a, 110b 110c, 110d in order to reduce the maximum power consumption by each of the second plurality of auxiliary ports 110a, 110b 110c, 110d. The power supply 140 may again monitor the combined system power after the generation of the control signal and couple this combined system power to the data server 130. The data server 130 may again compare the combined system power to a combined system power threshold. If the combined system power still exceeds the combined power threshold, the data server 130 may generate a control signal to couple via the data bus 120 to the first plurality of auxiliary ports 105a, 105b in order to reduce the maximum power consumption by each of the first plurality of auxiliary ports 105a, 105b. Alternatively, the data server may generate a control signal to couple via the data bus 120 to the second plurality of auxiliary ports 110a, 110b 110c, 110d in order to disable power consumption by each of the second plurality of auxiliary ports 110a, 110b 110c, 110d.

Figure 2:
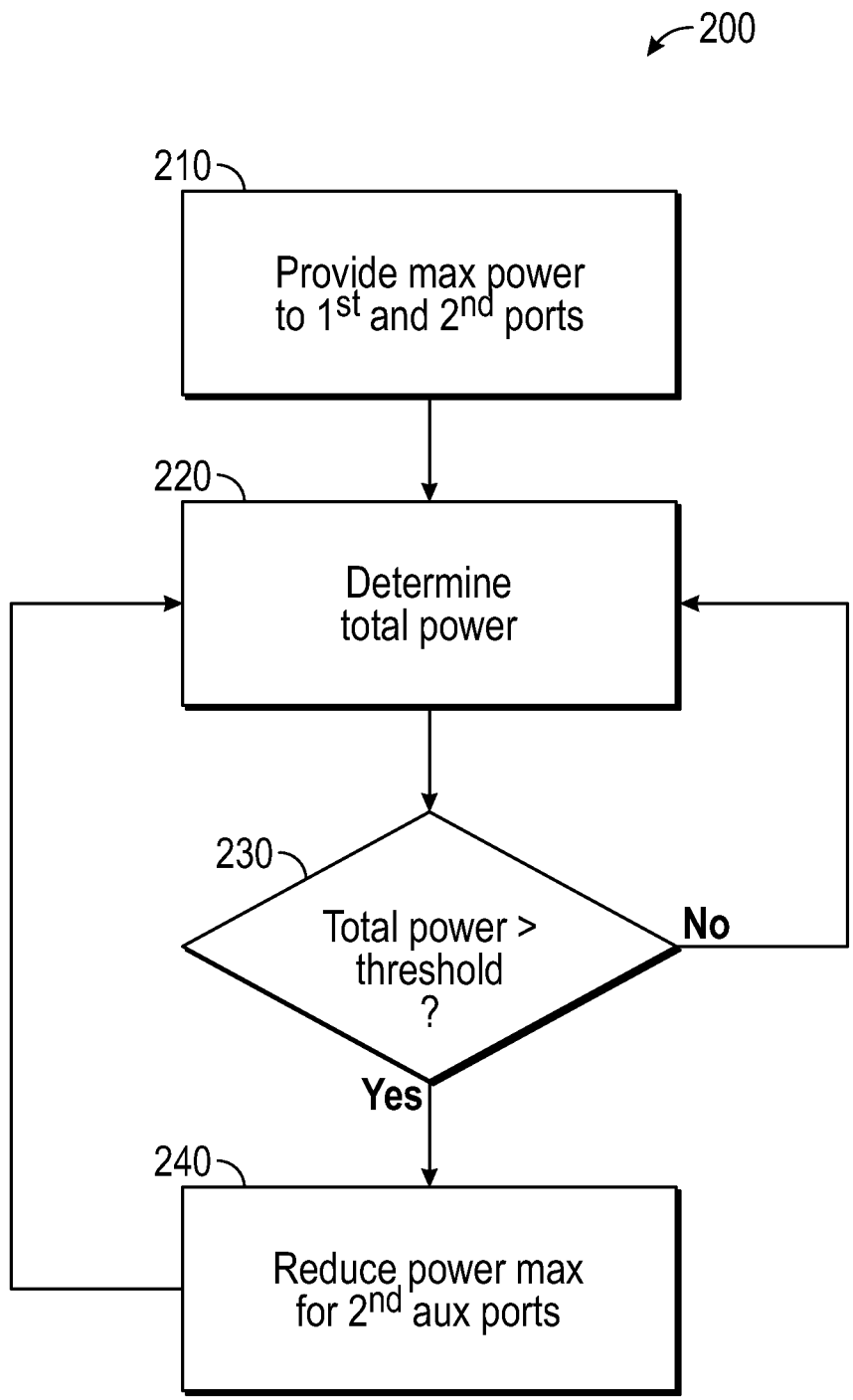
FIG. 2 shows a flow chart illustrating a method for providing dynamic auxiliary port power management according to an exemplary embodiment.

Turning now to FIG. 2 an exemplary method 200 for providing dynamic auxiliary port power management according to an exemplary embodiment of the present disclosure is shown. Upon initiation of an auxiliary port data and power distribution system, the exemplary method 200 is first operative to supply 210 a current to a first plurality of auxiliary ports and a second plurality of auxiliary ports.

The method is next operative to determine 220 the combined system power to the first plurality of auxiliary ports and a second plurality of auxiliary ports. The combined system power may be determined in response to a total current provided by a power supply to a power bus and a maximum voltage of the power bus. For example, if the total current provided by the power supply to the bus is 7.5 amps and the maximum voltage is 20 volts, the total power provided is 150 watts. Alternatively, the combined system power may be estimated by determining which auxiliary ports are in use and the maximum power rating for each port. For example, of three USB 3.0 ports and one USB-C ports are in use, as determined in response to a data connection or the like, the total system power is 9 watts for each of the USB 3.0 ports and 100 watts for the USB-C port, or 127 watts total.

The method is next operative to compare 230 the combined system power to a combined system power threshold. If the combined system power is less than the combined system power threshold, the method is operative to return to determining 220 the combined system power. The combined system power threshold may be the total maximum power that may be supplied to the auxiliary port system for use with connected devices. For example, if 10 amps is the maximum current that can be supplied to the auxiliary port system and the maximum voltage for USB-C devices is 20 volts, the combined system power threshold may be 200 watts. Alternatively, the combined system power threshold may be a percentage of the maximum safe power value, such as 80% of maximum. For example, the combined system power threshold may be 160 watts for a 200-watt maximum.

If the combined system power exceeds the combined system power threshold, the method is next operative to reduce 240 the maximum power consumption of the second plurality of auxiliary ports. In a first exemplary embodiment, the maximum power consumption is reduced by decreasing the maximum current to each of the second plurality of auxiliary ports from a first higher amperage to a second lower amperage. For example, the method may be operative to decrease the maximum amperage to the second plurality of auxiliary ports from 1 amp to 0.5 amps. This has the desirable effect of reducing the power draw for each connected device up to 2.5 watts. Alternatively, the method may disable all USB 3.0 and lower ports while maintaining voltage to all USB-C ports. In another alternative example, the method may reduce the current to all USB-C ports without an active data connection and maintain the present current level for USB-C devices with an existing data connection. After reducing the maximum power consumption of the second plurality of auxiliary ports, the method is operative to return to determining 220 the combined system power.

Figure 3:
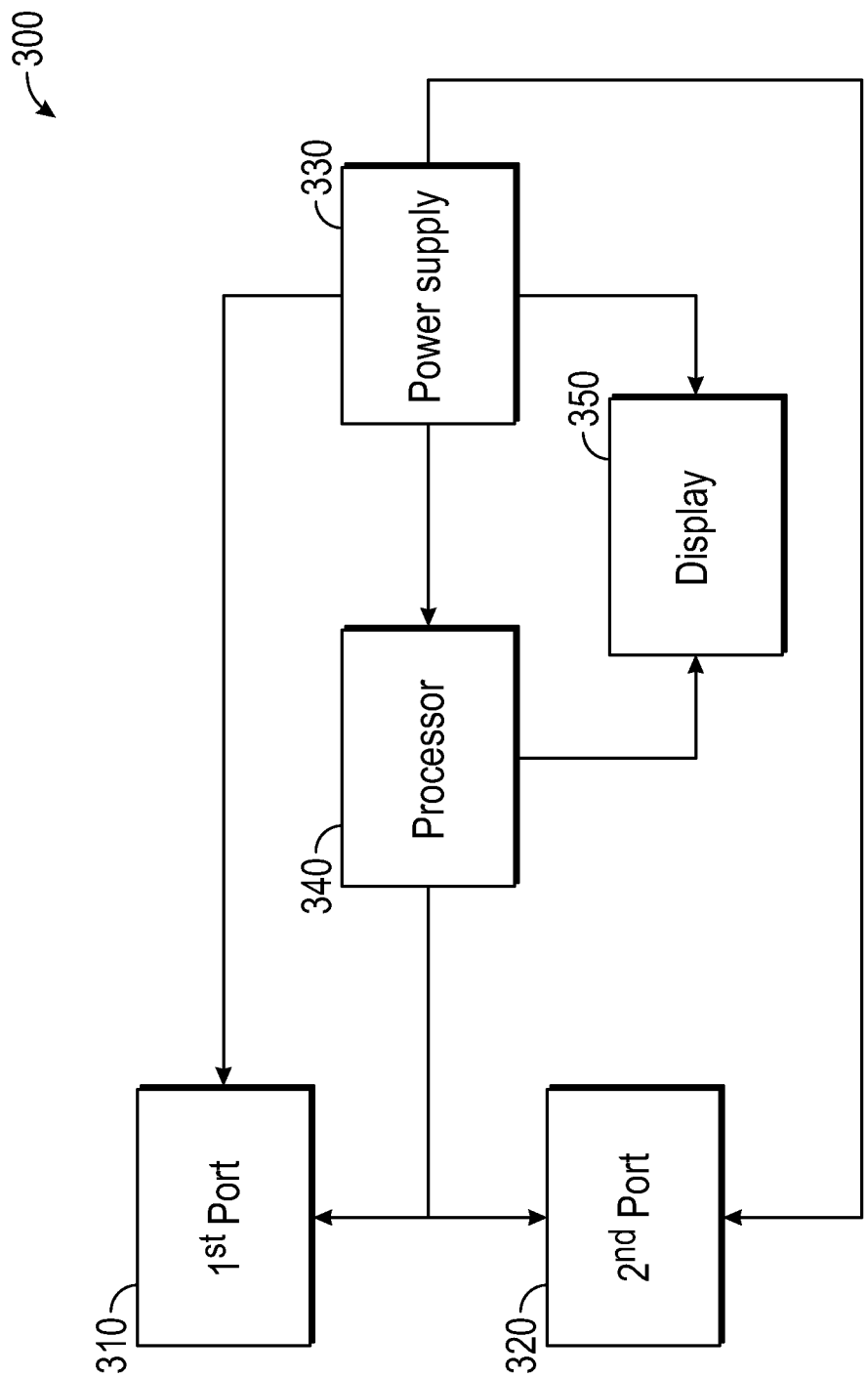
FIG. 3 shows a block diagram illustrating an alternative system for providing dynamic auxiliary port power management according to an exemplary embodiment.

Turning now to FIG. 3, a block diagram illustrating an exemplary implementation of a system 300 for providing dynamic auxiliary port power management is shown. The system 300 may include a first port 310, a second port 320, a power supply 330 and a processor 340.

The first port 310 configured to couple a first connected device to the power supply 330. The first port 310 is operative to receive electrical power from a power supply at a first voltage and with a first maximum current level. For example, the first port 310 may receive a 5 volt electrical power with a maximum amperage of 0.9 amperes. The connected device may be coupled to the first port 310 by a multiconductor cable and may consume up to the maximum amperage as required. For example, a fully charged mobile device connected to the first port 310 may not consume any current, while a mobile device with a fully depleted battery may consume the entire 0.9 amperes. The first port 310 may be a data transfer capable auxiliary port operative to provide power to the connected device as well as send and receive data from the connected device to a processor, server, or other device coupled to the first port 310. For example, the first port 310 may be a USB-C port operative to receive video data from a connected device, such as a laptop computer, and to couple this video data to a video processor and/or display 350 within an aircraft CMS for presentation to a user on a personal display 350 or to an aircraft cabin on a common display 350. The first port 310 may be further operative to form part of a local area network and to route data between auxiliary ports and connected devices. The first port 310 may be associated with a first portion of an aircraft cabin, such as a forward portion, or with a particular user. Alternatively, the first port 310 may be associated with an active data connection.

The second port 320 configured to couple a second connected device to the power supply. The second port 320 may be a USB 3.1 port or USB-C port and may be operative for coupling data between a connected device and a data server. The second port 320 may be a charge only port operative to provide an electrical power to a connected device, but unable to transfer data. In this charge only port example, the second port 320 would be operative to charge a connected device at a voltage and current provided by the power supply 330. The second port 320 may be associated with a second portion of an aircraft cabin, such as an aft portion, or with a particular user. Alternatively, the second port 320 may be associated with the absence of an active data connection.

In an exemplary embodiment, the first port 310 may be a first plurality of universal serial bus ports and the second port 320 may be a second plurality of universal serial bus ports. For example, the first port 310 may be a first plurality of USB ports within a forward aircraft cabin and the second port 320 may be a second plurality of USB ports with a rear aircraft cabin. In an alternate embodiment, the first port 310 may be a plurality of data transfer capable auxiliary ports and the second port 320 may be a plurality of charge only capable auxiliary ports.

The power supply 330 configured to generate one or more power supply voltages at one or more maximum amperages. For example, the power supply 320 may be operative to generate a 20 volt, 5 ampere power supply for coupling to a USB-C auxiliary port, a 5 volt, 0.9 ampere power supply for coupling to a USB 3.1 auxiliary port and a 24 volt, 6 ampere power supply for coupling to the processor 340 or another CMS device. In this exemplary embodiment, the power supply 330 is operative to couple a first current to the first port 310 and a second current to the second port 320. The power supply 330 is further configured to couple a third current to the second port in response to a control signal from a processor 340. The control signal may be generated by the processor 340 in response to a total system power exceeding a total system power threshold, thereby requiring a reduction in total supplied power. In a first exemplary embodiment the third current may have a lower amperage than the second current. In an exemplary embodiment, the second current may be a maximum current for a particular auxiliary port type and the third current may be the minimum current for a particular auxiliary port type. For example, the auxiliary port may be a USB auxiliary port, the third current may be 0.5 amps and the second current may be 1.5 amps. In some instances of extreme power savings, the third current may be zero amperes resulting in no power being provided to the second port 320. In another exemplary embodiment, a power supply or power conditioning circuit located proximate to the port may be used for switching voltages in response to a control signal from the processor 340 or the like.

The processor 340 may be part of a data server or CMS and may be configured to compare the sum of the first current and the second current to a threshold value and to generate the control signal in response to the sum of the first current and the second current exceeding the threshold value. The processor 340 may be operative to couple the control signal to the power supply 330. The power supply may then be operative to discontinue generation of the second current and commence generation of the third current in response to the control signal. In an exemplary embodiment, the second current and the third current may be simultaneously coupled to the second port 320 via a power bus and wherein the second port 320 is operative to select between the second current and the third current in response to the control signal.

Figure 4:
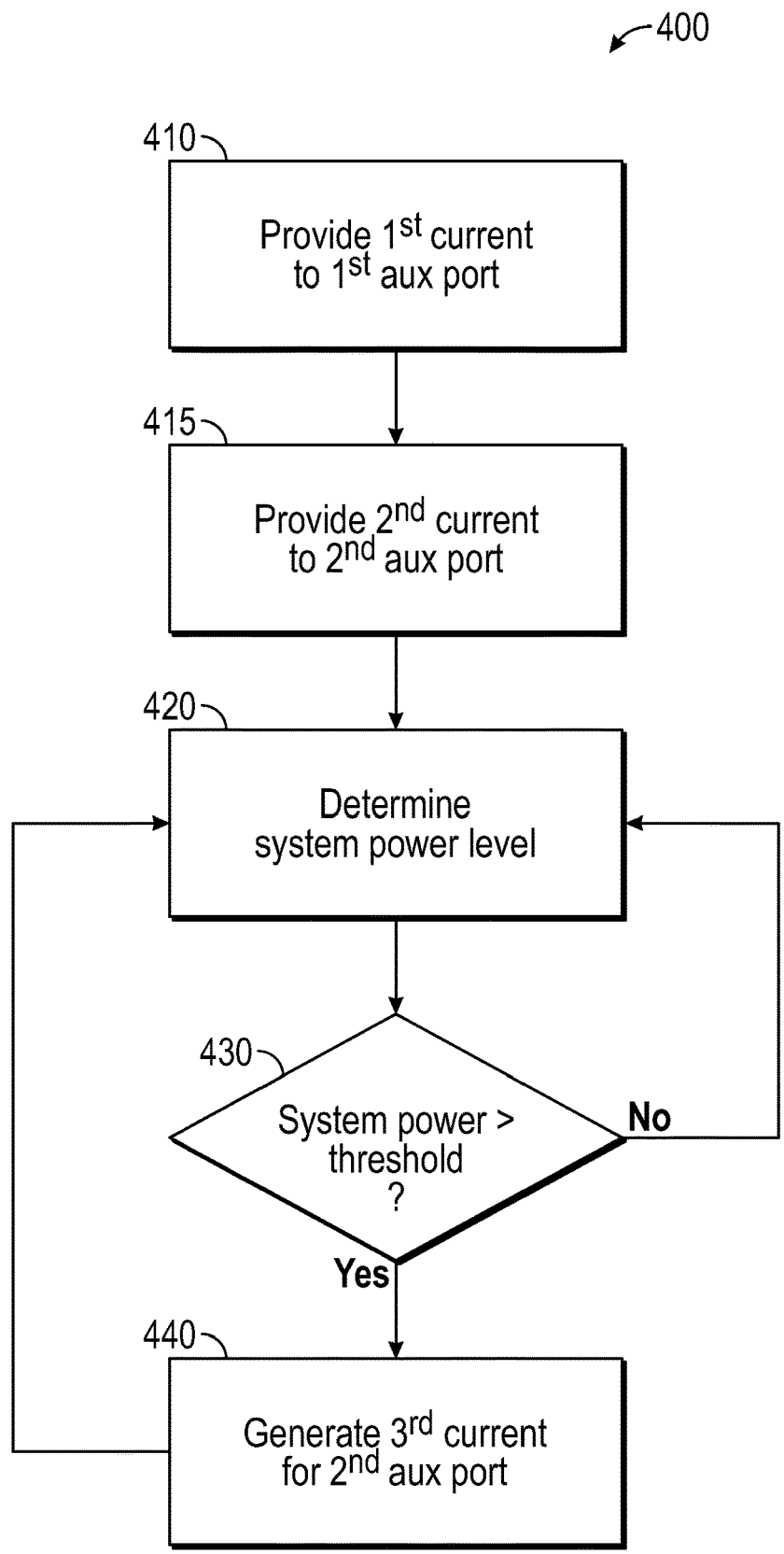
FIG. 4 shows a flow chart illustrating an alternative method for providing dynamic auxiliary port power management according to another exemplary embodiment.

Turning now to FIG. 4, a flow chart illustrating an exemplary implementation of a method 400 for providing dynamic auxiliary port power management is shown. The method, which may be performed by a processor, is first operative for providing 410 a first current to a first auxiliary port and for providing 415 a second current to a second auxiliary port. The processor may provide 410, 415 the first current and the second current by controlling a power supply or a power conditioning circuit. For example, a power supply may supply a voltage and current to the power conditioning circuit. The power conditioning circuit may then split the voltage and current into a first output voltage having a first maximum current and a second output voltage having a second maximum current. The power conditioning circuit may regulate the first maximum current and second maximum current in response to one or more control signals from the processor. The power conditioning circuit may be part of, or integral to, the power supply.

The method is next operative for determining 420 a system power level in response to the first current and the second current. The system power level may be determined in response to the first maximum current and the second maximum current and the various voltage levels. The method may alternatively determine the number and type of auxiliary ports in use and estimate a system power level. For example, if one USB-C port has a device connected and one USB 3.0 port has a connected device, the method may estimate that the total power consumption is 107.5 watts. Alternatively, the method may determine the type of port in use, such as USB 3.0 and USB-C to determine the various voltages and determine the first current level and the second current level to estimate the total system power.

The method may then compare 430 the system power level to a system power level threshold. The system power level threshold may be established as a percentage of a total maximum power output, such as 90% of the total maximum power capable of being supplied safely by the power supply. If the total system power does not exceed the threshold, the method returns to determining 420 the total system power level. If the system power level exceeds the system power level threshold, the method may then be operative to generate a control signal to couple to the power supply in order to reduce the system power level. The power supply may be operative to reduce the second current amperage to lower the total power generation. The reduced amperage current may then be a third current supplied to the second auxiliary port.

To reduce the system power level, the method may be next operative for providing 440 a third current to the second auxiliary port in response to the system power level exceeding the system power level threshold, the third current having a lower amperage than the second current. The method may be operative for continuing to provide the first current to the first auxiliary port in response to the system power level exceeding the system power level threshold. In one exemplary embodiment, the third current is zero amperes thereby discontinuing providing power to the second auxiliary port. Thus, the method may be operative for discontinuing providing the second current to the second auxiliary port in response to the system power level exceeding the system power level threshold.

In one exemplary embodiment the first auxiliary port is a universal serial bus type C port and the second auxiliary port may be a charge only capable USB port. The method is further operative to receive a data signal from the first auxiliary port, such as video data or the like for display on an in-cabin display. In addition, the first auxiliary port may be associated with a first user and the second auxiliary port may be associated with a second user. Alternatively, the first auxiliary port may be associated with a first location in an aircraft cabin and the second auxiliary port is associated with a second location in the aircraft cabin. The first auxiliary port may be associated with a data connection and the second auxiliary port may not be associated with a data connection. The first auxiliary port may be a first plurality of auxiliary ports and the second auxiliary port may be a second plurality of auxiliary ports.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or embodiments. It should be understood that various changes can be made in the function and arrangement of elements without departing from the scope of the disclosure as set forth in the appended claims and the legal equivalents thereof.

What is claimed is:

1. An apparatus comprising:
a first port configured to couple a first connected device to a power supply;
a second port configured to couple a second connected device to the power supply;
the power supply configured to couple a first current to the first port and a second current to the second port, the power supply being further configured to continue to couple the first current to the first port and to couple a third current to the second port in response to a control signal from a processor wherein the third current is less than the second current; and
the processor configured to compare the sum of the first current and the second current to a threshold value and to generate the control signal in response to the sum of the first current and the second current exceeding the threshold value.

2. The apparatus of claim 1 wherein the first port comprises a first plurality of universal serial bus ports and the second port is a second plurality of universal serial bus ports.

3. The apparatus of claim 1 wherein the second current has a higher amperage than the third current.

4. The apparatus of claim 1 wherein the third current is zero amperes.

5. The apparatus of claim 1 wherein the first port is a universal serial bus type C port.

6. The apparatus of claim 1 wherein the processor is further configured to receive data from the first port and the second port.

7. The apparatus of claim 1 wherein the second current and the third current are coupled to the second port via a power bus and wherein the second port is operative to select between the second current and the third current in response to the control signal.

8. A method performed by a processor comprising:
providing a first current to a first auxiliary port and a second current to a second auxiliary port;
determining a system power level in response to the first current and the second current;
comparing the system power level to a system power level threshold; and
providing a third current to the second auxiliary port in response to the system power level exceeding the system power level threshold and continuing to couple the first current to the first port, the third current having a lower amperage than the second current.

9. The method of claim 8 further including continuing to provide the first current to the first auxiliary port in response to the system power level exceeding the system power level threshold.

10. The method of claim 8 wherein the third current has zero amperes.

11. The method of claim 8 wherein the first auxiliary port is a universal serial bus type C port.

12. The method of claim 8 wherein the first auxiliary port is associated with a first user and the second auxiliary port is associated with a second user.

13. The method of claim 8 wherein the first auxiliary port is associated with a first location in an aircraft cabin and the second auxiliary port is associated with a second location in the aircraft cabin.

14. The method of claim 8 wherein the method is further operative to receive a data from the first auxiliary port.

15. The method of claim 8 wherein the first auxiliary port is a first plurality of auxiliary ports and the second auxiliary port is a second plurality of auxiliary ports.

16. The method of claim 8 wherein the first auxiliary port is associated with a data connection and the second auxiliary port is not associated with a data connection.

17. The method of claim 8 further including discontinuing providing the second current to the second auxiliary port in response to the system power level exceeding the system power level threshold.

18. An entertainment system in an aircraft cabin comprising:

a first auxiliary port operative at a first power level;

a second auxiliary port operative at the first power level;

a power supply for generating a first current to supply the first power level to the first auxiliary port and a second current to provide the first power level to the second auxiliary port; and a processor for determining a total power in response to the first current and the second current, the processor being further operative to generate a control signal to couple to the power supply to reduce an amperage of the second current in response to the total power exceeding a threshold power level and to continue to couple the first current to the first auxiliary port.

19. The entertainment system of claim 18 wherein the power supply is further operative to generate a third current in response to the control signal to provide a second power level at the second auxiliary port wherein the second power level is lower than the first power level.

20. The entertainment system of claim 18 wherein first auxiliary port is associated with a first location in the aircraft cabin and the second auxiliary port is associated with a second location in the aircraft cabin.

\* \* \* \* \*